INVENTOR.
MICHI MUKOJIMA
BY Kurt Kelman
Agent

United States Patent Office 3,414,344
Patented Dec. 3, 1968

3,414,344
FLEXIBLE OPTICAL SYSTEM FOR TRANSMIT-
TING LIGHT OR OPTICAL IMAGES
Michi Mukojima, 2–241 Tozuka-cho, Shinjuku-ku,
Tokyo, Japan
Filed Jan. 12, 1965, Ser. No. 424,949
Claims priority, application Japan, Jan. 18, 1964,
39/2,183
4 Claims. (Cl. 350—35)

ABSTRACT OF THE DISCLOSURE

A series of spherical lenses consecutively arranged in contact with each other transmits light and images through the entire series. When the index of refraction of lenses of equal diameter is suitably matched to the number of lenses in the series, a real image of an object touching the first lens in the series can be produced at the surface of the last lens, and many combinations of refractive index, lens diameter, and number of lenses are possible when conventional objectives and oculars are used. A series of spherical lenses in contact with each other and contained in a flexible tube conduct light and images in curved and bifurcated paths.

The present invention relates to flexible optical system in which light or optical images are transmitted to a desired point along a path of any desired curvature.

It is known to transmit images through a series of lenses within a tube so spaced that each lens is positioned at the conjugate point of the preceding one or through a bundle of light transmitting fibers. It is difficult to transmit light or an image by means of spaced lenses along a path having a small radius of curvature, and it is very difficult to produce a fiber bundle having good optical properties.

One object of this invention is to provide an optical system by which light or optical images can be transmitted along a path of any desired curvature.

Another object is to provide an optical system for transmitting light or optical images which is more simple and economical in construction than the aforedescribed known systems.

Figure 1:
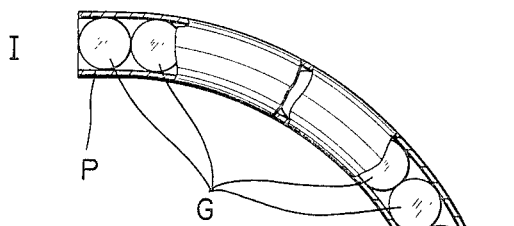
Figure 2:
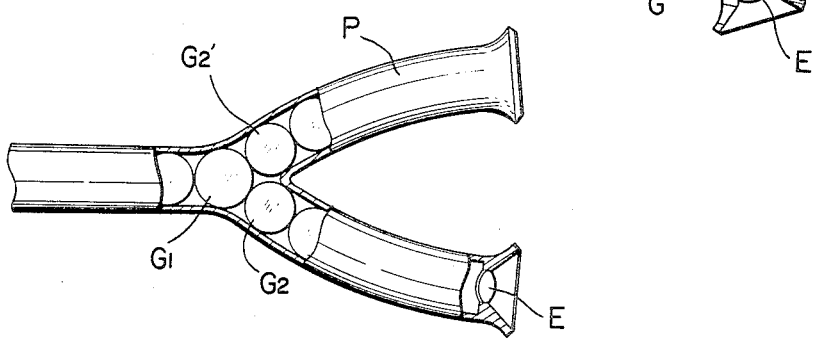
Figure 3:
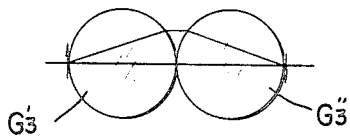
Figure 5:
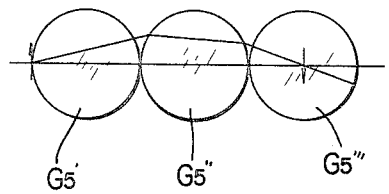
Figure 4:
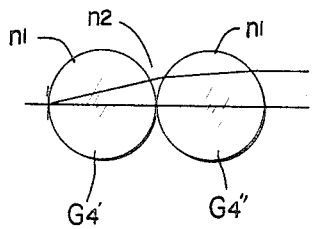

The invention will be described hereinbelow with reference to the accompanying drawings illustarting preferred embodiments of the invention, wherein:

FIGS. 1 and 2 are plan views of two different embodiments with portions broken away to illustrate the inside construction thereof, and FIGS. 3 to 5 are diagrammatic views showing various optical paths which exemplify the principles of the present invention.

Referring to the drawings, particularly to FIG. 1, a plurality of spherical lenses G are juxtaposed in series contact with each other in the axial bore of a flexible tube P which is constructed of opaque material, and a positive eyepiece E is positioned in the bore of the tube P in spaced axial alignment with the rearmost spherical lens G'. In an optical image transmitting device constructed as above, a spherical lens similar to the lenses G can be used as an objective (not shown). An optical image formed by the objective at the foremost point of the first spherical lens of the series, or light reflected from a body which is directly located in contact with the first spherical lens is transmitted through the lenses G, and produces a real image at a point near the rearmost spherical lens G'. This real image is magnified by the eyepiece E when the position of the eyepiece E is suitably adjusted.

Further, this invention provides a bifurcated binocular system as shown in FIG. 2, in which a spherical lens $G_1$, located at the end of one series of lenses, contacts two spherical lenses $G_2$ and $G_2'$ at the ends of respective series of lenses in branch tubes so that the light transmitted by the series ended by the lens $G_1$ is divided and is transmitted through the two series beginning with the lenses $G_2$ and $G_2'$, and an optical image can be observed by two eyes. The number of light or image-transmitting paths that can be so provided is not limited to two.

The transmission of optical images by a series of spherical lenses is based on the principle that an optical image is repeatedly formed by each set of a given number of sets of spherical lenses arranged in series and in contact with each other, the number of lenses in each set being dependent upon the refractive index of the lenses relative to the ambient medium.

For example, if the refractive index and the radius of all the spherical lenses are the same there are these possibilities: (1) assuming that the refractive index $n$ of the lens material equals 2 as shown in FIG. 3, the light of the optical image issuing from the foremost point of a first lense $G_3'$ is focused at the rearmost point of the adjacent lense $G_3''$ and forms an inverted real image of the same size, as shown in FIG. 3; (2) assuming that the refractive index $n$ equals $$\frac{4}{3} = 1.3333 \ldots$$

as shown in FIG. 4, the light of the optical image entering at the foremost point of the first spherical lense $G_4'$ passes through the second lens $G_4''$ and leaves said lens $G_4''$ as a parallel light bundle as shown in FIG. 4 and two or is focused at the rearmost point of the fourth spherical lens (not shown) of the set to form a real, inverted image on the same scale as the first image; (3) assuming that the refractive index $n$ equals 1.52759 as shown in FIG. 5, the light of the optical image entering at the foremost point of the first spherical lens $G_5'$ of a series of lenses passes through the second spherical lens and is focused in a transverse plane through the center of the third spherical lens $G_5'''$ producing a real image. The light entering at the foremost point of the foremost spherical lens is thus focused at the rearmost point of every fifth lens.

A real image is thus formed at the same point in each set in a series of spherical lenses without any change in the magnitude of the image.

The position and the magnitude of the optical pupil remains the same throughout the series, and brightness is not reduced except by absorption of the light by the medium and by loss of light by reflection at the boundary of the lenses.

Since spherical lenses are used, an optical axis need be considered only for two adjacent spherical lenses; therefore, the light can be transmitted through a path of any curvature in which the spherical lenses are located in series with adjoining lenses in contact with each other.

It is apparent that the above-mentioned values of refractive index can be changed without affecting the result as long as the ratio of the refractive index of the ambient medium to the refractive index of the spherical lenses is unchanged. For example, assuming that the space around the spherical lenses in FIG. 4 is filled with water, the refractive index of the spherical lenses $n$, should be made $$1.33 \times \frac{4}{3} = 1.78$$

because the refractive index of water is 1.33; an optical glass having such a refractive index can be selected from heavy flint glass.

Further, it is possible to obtain a magnified or reduced image at the rearmost spherical lens by increasing or decreasing the diameter of each succeeding lens in the series. An optical image can be transmitted properly even though the refractive index of all spherical lenses is not the same, provided that the lenses are arranged in a periodic manner so that the optical image is focused periodically at the rearmost point or at the center of a lens in the series.

The necessary number of spherical lenses in each set of a series used in constructing a flexible optical system of the invention depends on the index of refraction of the lens material. If $N=2$ as shown in FIG. 3, the image focused at the rearmost point of the last spherical lens in a series of 2N spherical lenses can be observed by an eyepiece, while the bundle of parallel light rays issuing from the last spherical lens in a series of $2N+1$ spherical lenses can be observed as an optical image by a suitable eyepiece on the same scale or on a magnified scale, N being any integer. That is any number of spherical lenses in the series. When the refractive index of the spherical lenses is 1.3333 as shown in FIG. 4, the real optical image focused at the rearmost point of the last lens in a series of 4N spherical lenses can be observed by an eyepiece on the same or on a magnified scale, while the divergent light bundle issuing from the last spherical lens in a series of $(4N+1)$ spherical lenses, the parallel light bundle issuing from the last spherical lens in a series of $(4N+2)$ spherical lenses, or the convergent light bundle issuing from the last spherical lens in a series of $(4N+3)$ spherical lenses can be observed as an optical image by means of a suitable eyepiece. That is any number of spherical lenses can be used in the series. When the refractive index of the spherical lenses is 1.52759 as shown in FIG. 5, the number of spherical lenses in the series can be any number different from 5N as long as a suitable eyepiece is selected.

In order to produce an optical image at the foremost point of the first spherical lens in the series, a body to be observed can be placed directly in contact with the first lens as shown in FIG. 1, or an objective can be utilized to focus the optical image at the foremost point of the first lens.

If a bundle of parallel light rays issuing from a body spaced from the first lens is incident on the first spherical lens, the first optical image in the series of lenses shown in FIG. 3 is focused at the foremost point of the second spherical lens in the series, and a bundle of parallel light rays issues from the last spherical lens in a series of 2N spherical lenses. If the refractive index is 1.3333 as shown in FIG. 4, the first optical image is focused at the foremost point of the third spherical lens in the series, and a bundle of parallel light rays issues from the last spherical lens in a series of 4N spherical lenses. If the refractive index of the spherical lens is 1.52759 as shown in FIG. 5, and a divergent light bundle issuing from a body positioned near the leading spherical lens in the series is incident on said leading lens, the first optical image is focused at the foremost point of the third spherical lens in the series, and a divergent light bundle issues from the last spherical lens in the series of 5N spherical lenses. However, in any of the above cases, an optical image can be observed by adjusting the position of the eyepiece or by adding one or two additional spherical lenses to the trailing end of the series.

The above description might suggest that this invention provides two distinct types of optical systems, one for observing images positioned in contact with the first spherical lens in the optical system and another for observing images or bodies positioned at a distance from the optical system. However, the tests made to date show that the same optical system can be adapted for observing images in contact with the first spherical lens in the optical system and images or bodies positioned at a distance from the optical system. The focal length of a spherical lens is very small and the displacement of the focal point due to displacement of the body to be observed is also very small, not enough to make a significant difference in most applications.

Good results were obtained by a small adjustment of the eyepiece when BK 7 glass (refractive index $n=1.5168$) was used in the spherical lenses in the device shown in FIG. 5 instead of glass having a refractive index of 1.52759. This shows that deviations in refractive index in the spherical lenses to the extent stated above do not affect the effectiveness of the invention.

Although I have shown and described specific embodiments of the invention, many modifications are possible, and, therefore, this invention is not to be restricted to the details of construction, shown and described, but is defined by the scope of the appended claims.

I claim:
1. An optical system comprising in combination:
   (a) a tube of opaque material having an axis and being formed with an axial bore therethrough, an axial portion of said tube being flexible; and
   (b) a plurality of lenses which are spherical bodies axially juxtaposed in said portion, axially consecutive lenses being in contact with each other, whereby said lenses constitute a series of contacting lenses.
2. A system as set forth in claim 1, wherein said lenses are equal in diameter and index of refraction.
3. A system as set forth in claim 1, further comprising a positive lens in said bore in spaced axial alignment with said series of lenses.
4. A system as set forth in claim 1, further comprising two branch tubes of said material formed with respective bores having terminal portions communicating with one axial end of the bore of said partly flexible tube, a plurality of spherical lenses which are spherical bodies arranged in the bore of each branch tube in series contact with each other, one lens in the bore of each branch tube making contact with a lens in the bore of said partly flexible tube.

References Cited

UNITED STATES PATENTS 3,257,902  6/1966  Hopkins _____ 350—54

DAVID SCHONBERG, *Primary Examiner.*

R. J. STERN, *Assistant Examiner.*